United States Patent
Burstein

(10) Patent No.: US 10,210,125 B2
(45) Date of Patent: Feb. 19, 2019

(54) RECEIVE QUEUE WITH STRIDE-BASED DATA SCATTERING

(71) Applicant: Mellanox Technologies, Ltd., Yokneam (IL)

(72) Inventor: Idan Burstein, Carmiel (IL)

(73) Assignee: Mellanox Technologies, Ltd., Yokneam (IL)

( * ) Notice: Subject to any disclaimer, the term of this patent is extended or adjusted under 35 U.S.C. 154(b) by 129 days.

(21) Appl. No.: 15/460,251

(22) Filed: Mar. 16, 2017

(65) Prior Publication Data

US 2018/0267919 A1 Sep. 20, 2018

(51) Int. Cl.
*G06F 13/40* (2006.01)
*G06F 9/54* (2006.01)

(52) U.S. Cl.
CPC .......... *G06F 13/4027* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 4,783,698 A | 11/1988 | Harney | |
| 5,668,809 A * | 9/1997 | Rostoker | H04L 12/5601 370/392 |
| 5,949,441 A | 9/1999 | Ristau | |
| 6,097,734 A | 8/2000 | Gotesman et al. | |
| 6,321,276 B1 | 11/2001 | Forin | |
| 6,766,467 B1 | 7/2004 | Neal et al. | |
| 6,789,143 B2 | 9/2004 | Craddock et al. | |
| 6,981,027 B1 | 12/2005 | Gallo et al. | |
| 7,171,484 B1 | 1/2007 | Krause et al. | |
| 7,263,103 B2 | 8/2007 | Kagan et al. | |
| 7,299,266 B2 | 11/2007 | Boyd et al. | |
| 7,464,198 B2 | 12/2008 | Martinez et al. | |
| 7,930,422 B2 * | 4/2011 | Freimuth | G06F 13/30 709/234 |
| 8,051,212 B2 | 11/2011 | Kagan et al. | |
| 8,176,252 B1 | 5/2012 | Alexander et al. | |
| 8,495,301 B1 | 7/2013 | Alexander et al. | |
| 8,682,108 B2 | 3/2014 | Tian et al. | |
| 8,751,701 B2 | 6/2014 | Shahar et al. | |

(Continued)

OTHER PUBLICATIONS

InfiniBand Trade Association, "InfiniBandTM Architecture Specification", vol. 1, Release 1.2.1, 1727 pages, Nov. 2007.
"MPI: A Message-Passing Interface Standard", Version 2.2, Message Passing Interface Forum, 647 pages, Sep. 4, 2009.
Shah et al., "Direct Data Placement over Reliable Transports", IETF Network Working Group, RFC 5041, 38 pages, Oct. 2007.
Culley et al., "Marker PDU Aligned Framing for TCP Specification", IETF Network Working Group, RFC 5044, 74 pages, Oct. 2007.

(Continued)

*Primary Examiner* — Michael Sun
(74) *Attorney, Agent, or Firm* — Kligler & Associates

(57) ABSTRACT

A method for communication includes posting in a queue a sequence of work items pointing to buffer consisting of multiple strides of a common, fixed size in a memory. A NIC receives data packets from a network containing data to be pushed to the memory. The NIC reads from the queue a first work item pointing to a first buffer and writes data from a first packet to a first number of the strides in the first buffer without consuming all of the strides in the first buffer. The NIC then writes at least a part of the data from a second packet to the remaining strides in the first buffer. When all the strides in the first buffer have been consumed, the NIC reads from the queue a second work item pointing to a second buffer, and writes further data to the strides in the second buffer.

35 Claims, 3 Drawing Sheets

(56) References Cited

U.S. PATENT DOCUMENTS

| | | | |
|---|---|---|---|
| 9,143,467 | B2 | 9/2015 | Kagan et al. |
| 9,270,299 | B2 | 2/2016 | Luby et al. |
| 9,367,746 | B2 | 6/2016 | Ishihara |
| 9,767,529 | B1 | 9/2017 | Liu et al. |
| 2002/0152327 | A1 | 10/2002 | Kagan et al. |
| 2003/0046530 | A1 | 3/2003 | Poznanovic |
| 2004/0156379 | A1* | 8/2004 | Walls ................ G06F 5/06 370/412 |
| 2004/0221128 | A1 | 11/2004 | Beecroft et al. |
| 2004/0230979 | A1 | 11/2004 | Beecroft et al. |
| 2005/0135395 | A1 | 6/2005 | Fan et al. |
| 2007/0124378 | A1 | 5/2007 | Elzur |
| 2007/0162619 | A1 | 7/2007 | Aloni et al. |
| 2008/0109562 | A1 | 5/2008 | Ramakrishnan et al. |
| 2009/0034633 | A1 | 2/2009 | Rodriguez et al. |
| 2010/0121971 | A1 | 5/2010 | Shao et al. |
| 2010/0262973 | A1 | 10/2010 | Ernst et al. |
| 2010/0274876 | A1 | 10/2010 | Kagan et al. |
| 2011/0268194 | A1 | 11/2011 | Nagano |
| 2012/0020413 | A1 | 1/2012 | Chen et al. |
| 2012/0033039 | A1 | 2/2012 | Sasaki et al. |
| 2013/0103777 | A1* | 4/2013 | Kagan ............ H04L 49/9031 709/212 |
| 2013/0322753 | A1 | 12/2013 | Lim et al. |
| 2015/0181211 | A1 | 6/2015 | He |
| 2015/0373075 | A1 | 12/2015 | Perlman et al. |

OTHER PUBLICATIONS

"Linux kernel enable the IOMMU—input/output memory management unit support", 2 pages, Oct. 15, 2007 http://www.cyberciti.biz/tips/howto-turn-on-linux-software-iommu-support.html.

Levi et al., U.S. Appl. No. 15/473,668, filed Mar. 30, 2017.

SMPTE Standard 2110-20:2017, "Professional Media Over Managed IP Networks: Uncompressed Active Video", The Society of Motion Picture and Television Engineers, 23 pages, Aug. 10, 2017.

SMPTE Standard 2110-30:201y, "Professional Media over IP Networks—PCM Digital Audio", The Society of Motion Picture and Television Engineers, 7 pages, Jan. 26, 2017.

SMPTE Standard 2110-21:201y, "Professional Media Over IP Networks: Timing Model for Uncompressed Active Video", The Society of Motion Picture and Television Engineers, 15 pages, Jan. 18, 2017.

SMPTE Standard 2110-10:201y, "Professional Media over IP Networks: System Timing and Definitions", The Society of Motion Picture and Television Engineers, 12 pages, Jan. 26, 2017.

SMPTE Standard—"Transport of High Bit Rate Media Signals over IP Networks (HBRMT)", The Society of Motion Picture and Television Engineers, 16 pages, Oct. 9, 2012.

International Application # PCT/IB2018/054350 search report dated Oct. 4, 2018.

U.S. Appl. No. 15/622,094 office action dated Dec. 27, 2018.

U.S. Appl. No. 15/790,075 office action dated Dec. 27, 2018.

* cited by examiner

RECEIVE QUEUE WITH STRIDE-BASED DATA SCATTERING

FIELD OF THE INVENTION

The present invention relates generally to data communications, and specifically to devices for interfacing between a computing device and a packet data network.

BACKGROUND

InfiniBand™ (IB) is a switched-fabric communications architecture that is widely used in high-performance computing. It has been standardized by the InfiniBand Trade Association. Computing devices (host processors and peripherals) connect to the IB fabric via a network interface controller (NIC), which is referred to in IB parlance as a channel adapter. Host processors (or hosts) use a host channel adapter (HCA), while peripheral devices use a target channel adapter (TCA).

Client processes (referred to hereinafter as clients) running on a host processor, such as software application processes, communicate with the transport layer of the IB fabric by manipulating a transport service instance, known as a "queue pair" (QP), made up of a send work queue and a receive work queue. To send and receive messages over the network using a HCA, the client initiates work requests (WRs), which cause work items, called work queue elements (WQEs), to be placed onto the appropriate work queues. Normally, each WR has a data buffer associated with it, to be used for holding the data that is to be sent or received in executing the WQE. The HCA executes the WQEs and thus communicates with the corresponding QP of the channel adapter at the other end of the link.

IB channel adapters implement various service types and transport operations, including remote direct memory access (RDMA) read and write operations, as well as send operations. Both RDMA write and send requests carry data sent by a channel adapter (known as the requester) and cause another channel adapter (the responder) to write the data to a memory address at its own end of the link. Whereas RDMA write requests specify the address in the remote responder's memory to which the data are to be written, send requests rely on the responder to determine the memory location at the request destination. This sort of send operation is sometimes referred to as a "push" operation, since the initiator of the data transfer pushes data to the remote QP.

Upon receiving a send request addressed to a certain QP, the channel adapter at the destination node places the data sent by the requester into the next available receive buffer for that QP. To specify the receive buffers to be used for such incoming send requests, a client on the host computing device generates receive WQEs and places them in the receive queues of the appropriate QPs. Each time a valid send request is received, the destination channel adapter takes the next WQE from the receive queue of the destination QP and places the received data in the memory location specified in that WQE. Thus, every valid incoming send request engenders a receive queue operation by the responder.

U.S. Pat. No. 7,263,103, whose disclosure is incorporated herein by reference, describes a method for network communication in which a pool of descriptors (or WQEs) is shared among a plurality of transport service instances used in communicating over a network. Each of the descriptors in the pool includes a scatter list, indicating a buffer that is available in a local memory. When a message containing data to be pushed to the local memory is received over the network on one of the transport service instances, one of the descriptors is read from the pool. The data contained in the message are written to the buffer indicated by the scatter list included in this descriptor.

U.S. Pat. No. 9,143,467, whose disclosure is incorporated herein by reference, describes a NIC with a circular receive buffer. First and second indices are provided to point respectively to a first buffer in a set to which the NIC is to write and a second buffer in the set from which a client process running on the host device is to read. Responsively to receiving a message, the data are written to the first buffer that is pointed to by the first index, and the first index is advanced cyclically through the set. The second index is advanced cyclically through the set when the data in the second buffer have been read by the client process. In some embodiments, the buffers are all of a uniform size, for example one byte.

SUMMARY

Embodiments of the present invention that are described hereinbelow provide efficient methods for handling data "push" operations and apparatus that implements such methods.

There is therefore provided, in accordance with an embodiment of the invention, a method for communication, which includes posting in a queue a sequence of work items, each work item pointing to at least one buffer consisting of a plurality of strides of a common, fixed size in a memory. Data packets are received from a network in a network interface controller (NIC) of the host computer, including at least first and second packets, which respectively contain at least first and second data to be pushed to the memory. A first work item pointing to a first buffer in the memory is read from the queue. The first data are written from the NIC to a first number of the strides in the first buffer sufficient to contain the first data without consuming all of the strides in the first buffer. At least a first part of the second data is written from the NIC to a remaining number of the strides in the first buffer. When all of the strides in the first buffer have been consumed, a second work item pointing to a second buffer in the memory is read from the queue, and further data in the data packets are written from the NIC to a further number of the strides in the second buffer.

In a disclosed embodiment, writing the further data includes writing a second part of the second data to the second buffer.

Typically, the NIC consumes an integer number of the strides in writing the data from each of the packets to the memory.

In one embodiment, the packets contain respective sequence numbers, and wherein the NIC selects the strides to which the data from each of the packets are to be written responsively to the respective sequence numbers.

Additionally or alternatively, posting the sequence of the work items includes setting the size of the strides to correspond to a size of the packets received on a given transport service instance. Typically, the packets include headers and payloads, and in one embodiment, each stride includes a first part that is mapped to a first region of the memory to receive the header of a given packet and a second part that is mapped to a different, second region of the memory to receive the payload of the given packet.

In some embodiments, the first and second packets belong to different, first and second messages transmitted to the host computer over the network by one or more peer devices. The first and second messages may be transmitted on different, first and second transport service instances, which share the queue of the work items. Additionally or alternatively, when each of the first and second messages ends with a respective last packet, the method includes writing respective completion reports from the NIC to the memory only after writing the data from the respective last packet in each of the first and second messages to the memory. Typically, the completion reports contains pointers to the strides to which the data in each of the messages were written.

In other embodiments, the method includes reserving a contiguous allocation of the strides in the first buffer for the first message, wherein writing the first data includes writing to the first number of the strides within the contiguous allocation, and wherein writing at least the first part of the second data includes writing to the remaining number of the strides following the contiguous allocation. In one such embodiment, the method includes writing a completion report from the NIC to the memory upon consuming the contiguous allocation or upon expiration of a predefined timeout after reserving the contiguous allocation when the contiguous allocation has not been fully consumed by the expiration of the predefined timeout.

In further embodiments, the method includes reserving a contiguous allocation of the strides in the first buffer for the first message, wherein writing the first data includes writing to the first number of the strides within the contiguous allocation, and writing a filler completion report from the NIC to the memory even when the contiguous allocation has not been fully consumed in order to release the first buffer and cause a subsequent message to be written to the second buffer.

In some embodiments, the method includes automatically learning in the NIC, responsively to traffic received from the network, a characteristic size of the messages transmitted to the host computer, and reserving a contiguous allocation of the strides in the first buffer for the first message while deciding how many of the strides to include in the contiguous allocation responsively to the characteristic size of the messages. In one such embodiment, automatically learning the characteristic size includes estimating a number of consecutive packets to be included in a large receive offload (LRO) operation. Additionally or alternatively, when the LRO operation applies to the packets that are received by the NIC in a first flow, which shares a receive queue with at least a second flow, different from the first flow, the method may include, upon receiving a packet from the second flow before the packets in the first flow have consumed all of the strides in the contiguous allocation, issuing a completion report with respect to the strides that have been consumed by the packets in the first flow, and writing the packet in the second flow to one or more of the strides remaining in the contiguous allocation.

In some embodiments, the method includes writing respective completion reports from the NIC to the memory after writing the data from each of the data packets to the memory. Typically, the completion reports contain metadata with respect to transport state information pertaining to the data packets. In one embodiment, the metadata are indicative of a state of a large receive offload (LRO) operation performed by the NIC.

In other embodiments, the method includes writing a respective completion report from the NIC to the memory after writing the data to a final stride belonging to each work item. In this case, the completion report may contain details of the data packets written to the at least one buffer pointed to by the work item.

In yet another embodiment, the method includes writing a respective completion report from the NIC to the memory after writing the data to a given stride when a number of the strides remaining in the first buffer is less than a predefined minimum.

Additionally or alternatively, posting the series of work items includes monitoring consumption of the work items responsively to the completion reports written to the memory, and posting one or more further work items to the queue when a remaining length of the queue drops below a designated limit.

There is also provided, in accordance with an embodiment of the invention, computing apparatus, including a memory and a host processor, which is configured to post in a queue a sequence of work items, each work item pointing to at least one buffer in the memory, each buffer consisting of a plurality of strides of a common, fixed size. A network interface controller (NIC) is configured to receive data packets from a network, including at least first and second packets, which respectively contain at least first and second data to be pushed to the memory, to read from the queue a first work item pointing to a first buffer in the memory, to write the first data to a first number of the strides in the first buffer sufficient to contain the first data without consuming all of the strides in the first buffer, to write at least a first part of the second data from the NIC to a remaining number of the strides in the first buffer, and when all of the strides in the first buffer have been consumed, to read from the queue a second work item pointing to a second buffer in the memory, and to write further data in the data packets from the NIC to a further number of the strides in the second buffer.

There is additionally provided, in accordance with an embodiment of the invention, a network interface controller (NIC), including a host interface, which is configured to be connected, via a host bus, to a host processor, which is configured to post a sequence of work items in a queue for access by the NIC, each work item pointing to at least one buffer in a memory, each buffer consisting of a plurality of strides of a common, fixed size. A network interface is configured to receive data packets from a network, including at least first and second packets, which respectively contain at least first and second data to be pushed to the memory. Packet processing circuitry is configured to read from the queue a first work item pointing to a first buffer in the memory, to write the first data via the host interface to a first number of the strides in the first buffer sufficient to contain the first data without consuming all of the strides in the first buffer, to write at least a first part of the second data via the host interface to a remaining number of the strides in the first buffer, and when all of the strides in the first buffer have been consumed, to read from the queue a second work item pointing to a second buffer in the memory, and to write further data in the data packets via the host interface to a further number of the strides in the second buffer.

The present invention will be more fully understood from the following detailed description of the embodiments thereof, taken together with the drawings in which:

DETAILED DESCRIPTION OF EMBODIMENTS

Figure 1:
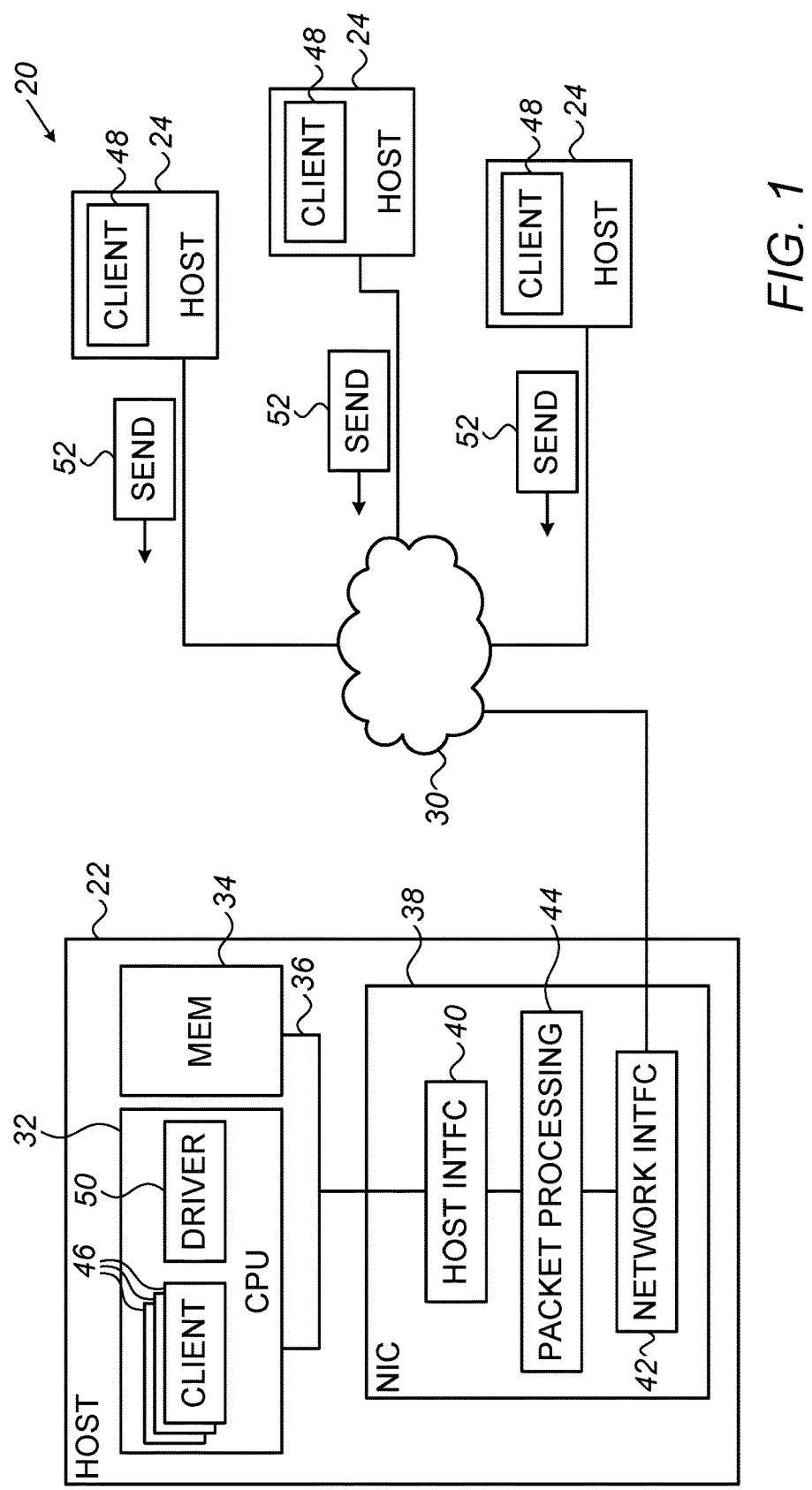
FIG. 1 is a block diagram that schematically illustrates a data communication system, in accordance with an embodiment of the present invention.

Pushing data to a remote node in a packet network—using send operations, for example—is a useful model for many data transfer operations, but it incurs substantial overhead: In conventional implementations, the client process on the receiving host device must continually post WQEs to the appropriate receive queue (or queues), and the NIC must fetch one of these WQEs and use the buffer information that it contains for each incoming send packet that it handles. The WQEs in the receive queue can consume considerable memory, and the production and consumption of these WQEs can add latency in processing of the pushed data, as well as consuming resources of the host CPU.

The approach described in the above-mentioned U.S. Pat. No. 9,143,467 is said to obviate the need for WQEs in receiving pushed data from a network via a suitably-configured NIC. This approach instead requires that client processes allocate in advance a contiguous, cyclical set of buffers in the host memory for use by QPs in receiving packets containing data to be pushed to the host memory. To avoid buffer overflow (and consequently, frequent retransmission of packets), however, the set of buffers that is allocated must be large enough to handle large bursts of data, which are common in many network applications. These buffer allocations can thus create a substantial memory "footprint," which may be largely unused during quiescent periods between bursts.

Embodiments of the present invention that are described herein provide an alternative solution, which enables more efficient use of host resources in receiving pushed data, balancing memory footprint against overhead. In these embodiments, work items (such as WQEs) posted in a receive queue point to respective buffers in a memory, and each of these buffers is divided into multiple strides. Typically, the host processor will post a sequence of this sort of work items in the receive queue, for use in handling incoming packets (such as IB send packets) containing data to be pushed to the memory. In the embodiments described hereinbelow, the buffers in question are assumed to be in the host memory; but alternatively, some or all of these stride-based buffers may be in another memory, such as a memory that is attached to or contained in the NIC.

"Strides," in the context of the present description and in the claims, are segments of memory of a common, fixed size, which may be as small as a single byte or many bytes in length. For example, the sizes of the strides may advantageously be set to correspond to the expected packet size on a given transport service instance (i.e., equal to or fractionally larger than the expected packet size. The segments may be contiguous in the memory address space, but in some applications, non-contiguous memory segments may be advantageous. For example, to accommodate a sequence of packets having headers and payloads of fixed, respective size, each stride may comprise a first part that is mapped to one region of memory to receive the headers and a second part that is mapped to another region to receive the payloads.

The sort of stride-based receive queue that is described herein may advantageously be shared among multiple transport service instances (for example, multiple QPs), although alternatively, the stride-based approach described herein may be applied separately to individual QPs. Stride-based receive queues may be used with substantially any type of transport instance, including both reliable and unreliable transport types.

When the NIC receives a packet from the network containing data to be pushed to the memory on a stride-based receive queue, it reads the next work item from the queue and writes the data from the packet to the buffer indicated by the work item. In contrast to conventional usage, however, the data write operation does not necessarily consume the entire buffer and the corresponding work item. Rather, the NIC writes only to the number of strides required to contain the data, with each packet consuming an integer number of strides (even if the packet data do not completely fill the last stride that is consumed). Any remaining strides are then used by the NIC in writing the data from the next incoming packet, even if this next packet belongs to a different message (and possibly a different transport service instance) from the first packet. (The term "message," in the context of the present description and in the claims, refers to any logical unit of data transferred over the network, and may comprise a single packet or multiple packets transmitted on the same transport service instance. For example, a message may correspond to an InfiniBand RDMA or Send transaction; or it may comprise the sequence of packets that are processed together by the NIC in an Ethernet large receive offload [LRO] session, as described below.) Thus, a single work item and its corresponding buffer may be consumed in receiving and writing data to memory from a single large packet or from a sequence of two or more smaller packets.

The NIC will generally read and make use of the next work item in the queue only when all of the strides in the first buffer have been consumed. (Alternatively, in some scenarios, multiple WQEs may be opened and used in parallel for different receive sessions.) The NIC will then handle this next work item and its corresponding buffer, as well as further work items, in similar fashion. If a given buffer has an insufficient number of strides remaining to accommodate all of the data in a given packet, the NIC can write the first part of the data to the remaining strides in this buffer, and then write the remainder of the data to the buffer indicated by the next work item. Alternatively, upon receiving a packet that is too long to fit into the remaining strides of a given work item, the NIC can issue a "filler completion report" (also referred to below as a "dummy CQE") to release the remaining strides that were allocated to the work item, and can then write the packet to the buffer indicated by the next work item.

The host processor monitors consumption of the work items, for example by reading and processing completion reports written by the NIC to the memory after writing the data from the data packets to the memory, and can thus track the remaining length of the queue of work items. When this length drops below a designated limit, the host processor posts one or more further work items to the queue. Thus, work items are written, and corresponding memory buffers are reserved only as needed. This approach can be used to limit the memory footprint associated with the receive queue to a size no larger than actually required, while at the same time ensuring that buffers will be available when required.

This novel receive queue model can be useful in many data communication scenarios, but it is particularly advantageous in handling incoming data traffic that can include both small and large packets and may be characterized by unpredictable bursts. The stride-based buffers and work items enable the host processor and NIC to handle such traffic efficiently, in terms of both memory footprint and overhead incurred by the host processor and bus.

The embodiments described with reference to the figures hereinbelow refer, for the sake of concreteness and clarity, specifically to IB networks and use vocabulary taken from the IB standards. The principles of the present invention, however, are similarly applicable to data communications over other sorts of packet networks, such as Ethernet and Internet Protocol (IP) networks. In particular, the techniques described herein may be implemented, mutatis mutandis, in the context of send operations specified by other RDMA protocols that are known in the art, such as RDMA over Converged Ethernet (RoCE) and the Internet Wide Area RDMA Protocol (iWARP), as well as in the context of other sorts of transport protocols, such as the Transmission Control Protocol (TCP).

FIG. 1 is a block diagram that schematically illustrates a data communication system 20, in accordance with an embodiment of the present invention. A host computer 22 (also referred to as a host or a host device) communicates with other hosts 24 via a network 30, such as an IB switch fabric. Computer 22 comprises a processor, in the form of a central processing unit (CPU) 32, and a host memory 34 (also referred to as a system memory), which are connected by a suitable bus 36, as is known in the art. A NIC 38, such as an IB HCA, connects computer 22 to network 30.

NIC 38 comprises a network interface 42, which is coupled to network 30, and a host interface 40, which connects to CPU 32 and memory 34 via bus 36. Packet processing circuitry 44, coupled between network interface 42 and host interface 40, generates outgoing packets for transmission over network 30 and processes incoming packets received from the network, as described below. Interfaces 40 and 42 and circuitry 44 typically comprise dedicated hardware logic, whose details will be apparent to those skilled in the art after reading the present description. Alternatively or additionally, at least some of the functions of circuitry 44 may be implemented in software on a suitable programmable processor.

Client processes (referred to simply as clients 46) running on CPU 32, such as processes generated by application software, communicate with clients 48 running on remote hosts 24, 26, 28 by means of QPs on NIC 38. Each client 46 is typically assigned multiple QPs, which are used to communicate with different clients on various remote hosts. Some of these QPs may operate in the conventional manner, as described earlier, according to which client 46 posts WQEs to both the send queue and the receive queue of the WQE. Other QPs, however, have a shared receive queue, containing WQEs that point to stride-based buffers, as defined above.

In this latter arrangement, a NIC driver program 50, running on CPU 32, allocates buffers for receiving pushed data that are conveyed by IB send packets 52 from clients 48 on peer devices (hosts 24) to any of the participating QPs. The buffers are divided into strides of a certain, uniform size, which may be set by the driver program. NIC 38 is informed of this QP configuration, typically at the time of initialization of the QP, and handles incoming send requests accordingly.

Figure 2:
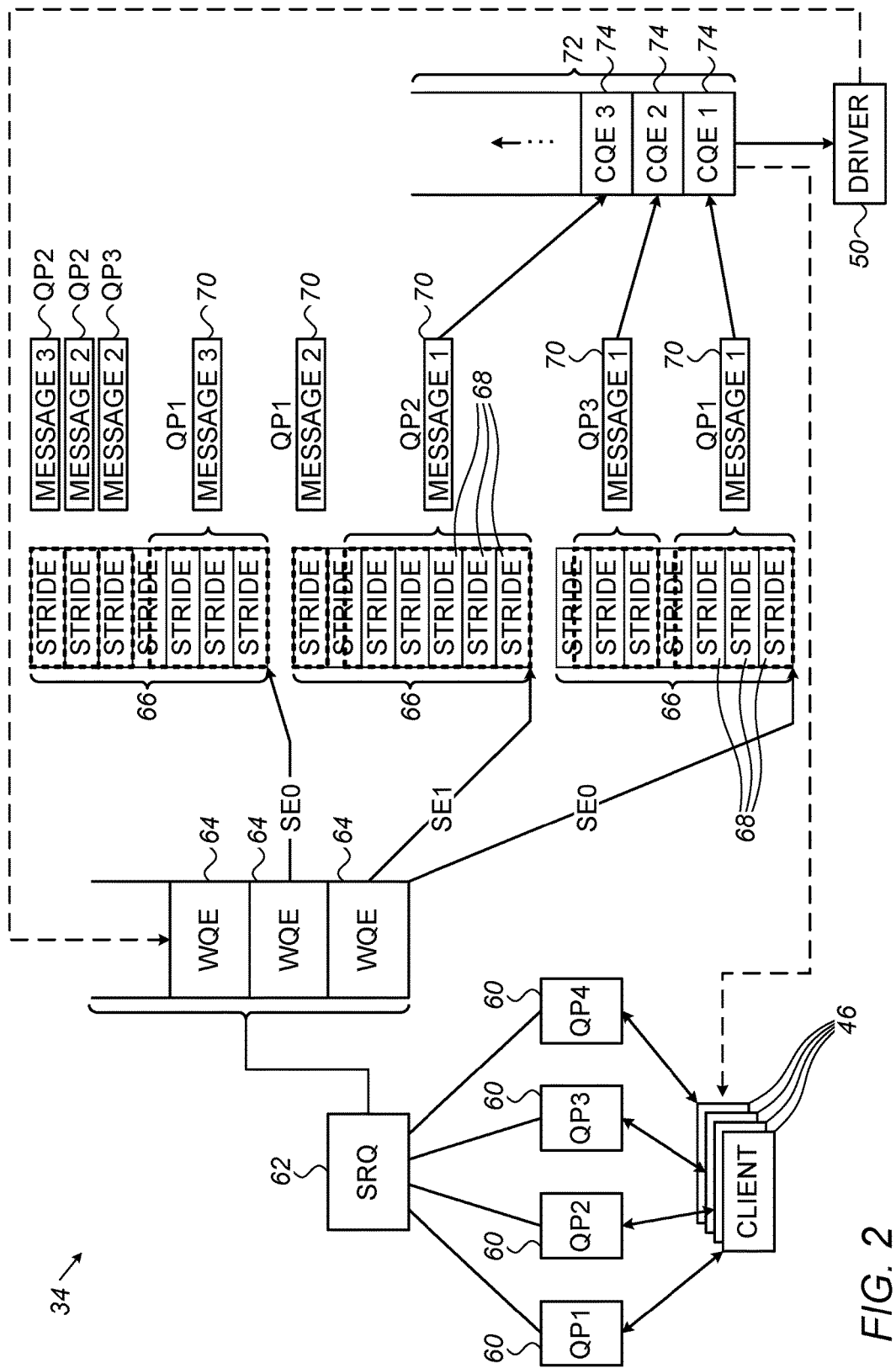
FIG. 2 is a block diagram that schematically illustrates allocation of data buffers in a memory, in accordance with an embodiment of the present invention.

FIG. 2 is a block diagram that schematically illustrates allocation of data buffers 66 in host memory 34, in accordance with an embodiment of the present invention. Clients 46 are assigned respective QPs 60, which are pre-configured to use receive WQEs 64 that are queued in a shared receive queue (SRQ) 62. The assignment of QPs 60 to SRQ 62 is recorded, for example, in the QP context of each QP (not shown in the figures), which is typically held in memory 34, thus enabling packet processing circuitry 44 in NIC 38 to identify and read WQEs 64 from SRQ 62 when packets are received from network 30 on these QPs.

Each WQE 64 comprises one or more scatter entries (referred to as SE0, SE1, etc., in FIG. 2). Each scatter entry points to the base address of a corresponding buffer 66 that has been reserved in memory 34. Each buffer 66 is divided into an integer number of strides 68, of a predefined size. The stride size may be chosen, for example, on the basis of the expected data size of incoming packets on QPs 60, so that small packets consume a single stride, while larger packets consume multiple strides. All buffers 66 may conveniently be of the same size, and thus contain the same number of strides, or they may be of different sizes.

In the pictured example, NIC 38 receives a sequence of Send packets 70 from network 30 on QPs 60 labeled QP1, QP2 and QP3. Each packet 70 belongs to a respective message, which was transmitted from a corresponding client on a peer device, such as one of hosts 24. These messages are labeled in FIG. 2 as Message 1, Message 2, etc., for each QP. Some of packets 70 contain long payload data for delivery to memory 34. Such packets may possibly belong to multi-packet messages (not shown in the figure), and the headers of these packets typically contain a field indicating whether they are first, last, or middle packets of the respective messages. Other packets may contain short payload data or may contain commands with no data to be scattered to memory 34.

Upon receiving the first Send packet 70 in the sequence via network interface 42, corresponding to Message 1 on QP1, processing circuitry 44 in NIC 38 reads the first WQE 64 from SRQ 62 from memory 34 via host interface 40, and then reads scatter entry SE0 from the WQE. Processing circuitry 44 extracts and writes the payload data from this first packet, via host interface 40, to the buffer 66 indicated by SE0, beginning from the base address and extending over a sufficient number of strides 68 to contain all of the data. An integer number of strides is consumed by each packet, and the last stride is filled with dummy data if the packet data do not reach the end of the stride.

If not all of the strides in buffer 66 are consumed by this first packet, processing circuitry 44 writes the payload data from the next packet 70 (Message 1 on QP3) to the remaining strides 68 in this same, first buffer 66, as illustrated in FIG. 2. In the example shown in the figure, there is a sufficient number of strides remaining in the first buffer to accommodate all of the data from the second packet. Alternatively, if the number of strides remaining is not sufficient, part of the data from the second packet may be written to the remaining strides in the first buffer, while the remainder of the packet data are written to the next buffer.

When all of the strides in the first buffer have been consumed, processing circuitry 44 reads the next available scatter entry, in this case SE1 from the first WQE 64 in SRQ 62, and writes the next packet or packets to the strides of the buffer 66 that is indicated by SE1. Only when all of the buffers indicated by the first WQE have been exhausted does processing circuitry 44 read the next WQE 64 from SRQ 62. Processing circuitry 44 uses the scatter entry or entries in this WQE to write further packet data to the appropriate numbers of strides 68 in the next buffer, and continues in this manner as long as there are incoming packets to handle on QPs 60.

After it has finished writing the data from each packet 70 to the appropriate buffer 66, processing circuitry 44 writes a completion report, such as a completion queue entry (CQE) 74, to a completion queue 72 in memory 34. CQE 74 indicates the QP 60 to which the packet was addressed and, in the case of multi-packet messages, whether the packet was the first, middle, or last packet in the message. This information is read by clients 46, which are then able to read and process the data that was sent to them on their corresponding QPs 60.

In alternative embodiments, processing circuitry 44 may apply other criteria in deciding when to write a CQE to memory 34. The criteria for reporting completion can be selected, inter alia, so as to reduce the number of completion reports that CPU 32 is required to process. For example, in one embodiment, processing circuitry 44 writes CQEs 74 only once per message, after writing the data from the last packet in each message to memory 34. In this case, the CQE typically contains a scatter list containing one or more pointers indicating the strides to which the packets in the message were written. Additionally or alternatively, processing circuitry 44 writes one CQE 74 per scatter entry, for example after writing data to the final stride 68 in a given buffer 66, or one CQE per WQE 64, after writing the data to the final stride belonging to the WQE.

In this latter case, CQE 74 typically contains further information to enable processes running on CPU 32 to parse and process the data that have been written to memory 34. For instance, the CQE may contain details of packets and/or messages scattered to be the buffer or buffers pointed to by the WQE in question, such as association between packets or messages and corresponding transport service instances (QPs or LRO sessions), stride indexes, and an indication whether each packet was the first, last or intermediate packet in a multi-packet message. As one example, the CQE with regard to a certain WQE could contain the following information:

Packet first, QP 0×1, size=1 KB
Packet only, QP 0×2, size=4 KB
Packet middle, QP 0×1, size=1 KB
Packet first, QP 0×3, size=4 KB
Packet last, QP 0×1, size=8 B
Dummy filler, size=64 B (since there was leftover space)

For each packet 70, CQE 74 indicates the number of strides 68 consumed by the packet. (For this purpose, even command packets that contain no payload data are considered to have consumed a single stride.) Driver program 50 reads this information from CQEs 74 and is thus able to track the consumption of buffers 66. When driver program 50 finds in this manner that several WQEs 64 from SRQ 62 have been consumed, so that the remaining number of WQEs is below a certain limit (which may be configured in software), the driver program allocates one or more additional buffers 66 in memory 34 and writes one or more additional WQEs to the SRQ pointing to these buffers. Thus, when program parameters are properly set, SRQ 62 should always contain a sufficient number of WQEs 64 to handle incoming traffic, while maintaining a memory footprint (in terms of allocated buffers 66) that is no larger than actually required by current traffic conditions.

In some cases, such as when only a small number of strides remains available in a given buffer 66, processing circuitry 44 may write a "dummy CQE" with respect to these strides in order to cause driver program 50 to release the buffer and write a new WQE. Processing circuitry 44 will then start writing data from the next packet to the first stride in the next buffer. The approach is useful particularly when the number of strides remaining is less that a certain predefined minimum, for example, when the number of strides is insufficient for the next packet or allocation of strides to be made by the processing circuitry.

Additionally or alternatively, processing circuitry incorporates in CQEs 74 metadata with respect to transport state information pertaining to the data packets. These metadata may include, for example, an indication as to whether the corresponding packet was the packet in a given message, a middle packet, or the last packet. The "message" in question may be, for example, a Send message, or it may be a sequence of packets that are received in in an LRO operation. The metadata thus enable clients 46 and/or driver program 50 to determine when the message is complete and which data should be read from memory 34 as part of the message. For example, when NIC 38 allocates contexts for LRO operations to flows on a certain QP 60, and then aggregates the data packets belonging to a given flow on the QP into an LRO, the metadata in the CQEs can indicate the state of the context of the LRO.

In an alternative embodiment (not shown in the figures), processing circuitry 44 reserves a contiguous allocation of strides 68 in one or more of buffers 66 for each message 70, or at least for certain messages, for example, message on a certain QP or QPs 60. Upon receiving a packet belonging to a message for which such an allocation has been reserved, processing circuitry 44 writes the data from the packet to an appropriate number of the strides within the contiguous allocation. When a packet belonging to a different message or QP arrives in the interim, processing circuitry 44 writes the data from this latter packet to the remaining number of the strides in the buffer following the contiguous allocation. Alternatively, under such circumstances, when this new message is too large to be accommodated in the current buffer, processing circuitry 44 may close the buffer, for example by issuing a dummy (filler) CQE, and may then write the data from the packet to the first stride or strides in the next buffer.

This sort of scheme is useful for QPs that carry messages of constant (or roughly constant) size, and can also be adapted for use with large receive offloads (LROs) in Ethernet and IP networks. In these cases, processing circuitry 44 can reserve contiguous allocations of multiple strides corresponding to characteristic size of the messages or to the LRO reservation size. Each new message or LRO session (which is regarded as a type of "message" in the present context) initiated by packet processing circuitry 44 reserves an allocation of fixed size, containing a certain number of strides, in a corresponding buffer, and each such reservation holds a timer for buffer release. The timer starts when the buffer is reserved and closes when the reserved allocation is full. When the contiguous allocation has been consumed or when timer expires (when the contiguous allocation has not been fully consumed by the expiration of the predefined timeout), circuitry 44 issues a CQE 74 so that CPU 32 will process the data that have been written to the buffer. Unused strides remaining in a given buffer can be used by another message or a subsequent session. Multiple messages or sessions can run in parallel, each with its own buffer, with the number of messages or sessions limited by the number of available buffers or WQEs in the queue.

When multiple strides are allocated in advance to accommodate the packets in a multi-packet message, processing circuitry 44 can make use of the allocation in delivering the message data to CPU 32 in the proper order, even when the packets are received out of order or are received intermittently on different QPs that share the same SRQ. For this purpose, processing circuitry 44 does not necessarily write the packets to the strides in the order of packet arrival, but rather according to the packet sequence numbers in the packet headers. In this manner, the processing circuitry selects the strides to which the data from the packets are to be written according to the respective sequence numbers, so that the data are written to the allocated strides in the proper order.

The above reservation scheme is also useful in mitigating the burden on CPU 32, since it reduces the number of CQEs that the CPU is required to process and enables clients 46 to access received messages by reading contiguous data segments from memory 34. The allocation size can vary among QPs 60—and even among the different QPs sharing the same SRQ 62—depending upon the characteristic size of the messages transmitted to host computer 22 on each QP. When this characteristic message size is known in advance, the allocation size per message can be fixed for each QP by software, for example by driver program 50. Alternatively or additionally, driver program 50 or processing circuitry 44 may automatically learn the characteristic message size for each QP based on the traffic received from network 30. In either case, processing circuitry 44 will then decide how many strides to include in each allocation based on the characteristic size of the messages, so that each message fits into its allocated number of strides with minimal wasted space in the buffer.

As a specific example, processing circuitry 44 may learn how many strides 68 should be included in an optimal LRO reservation. Generally speaking, the optimal reservation size for a given packet flow is determined by the number of consecutive packets that are likely to reach SRQ 62 from this flow, before a packet from a different flow enters the SRQ. (A "flow" in this context means a sequence of packets transmitted to NIC 38 from a given client 48 on a peer host 24, for example a sequence of packets having the same source and destination addresses, source and destination ports, and protocol.) This number of consecutive packets depends, for example, on the burstiness of the flow in question and the rate of traffic in other flows on SRQ 62. Upon tracking and learning these flow characteristics, processing circuitry 44 can then estimate the number of consecutive packets that are likely to arrive in a given burst and will typically set the LRO reservation size to be a small number of strides larger than is needed to accommodate the estimated burst size.

Using this approach, each of the bursts of packets received by NIC 38 on the flow in question will consume nearly all of the strides in the corresponding LRO reservation. Processing circuitry 44 can then release any remaining strides in the reservation by issuing a dummy (filler) CQE, as explained above. Alternatively, when a packet from another flow reaches SRQ 62 before the LRO reservation has been consumed, processing circuitry 44 may close out the reservation by issuing a CQE with respect only to the strides that have actually been consumed by the flow for which the reservation was made, and may then use the remainder of the reservation for other flows.

Figure 3:
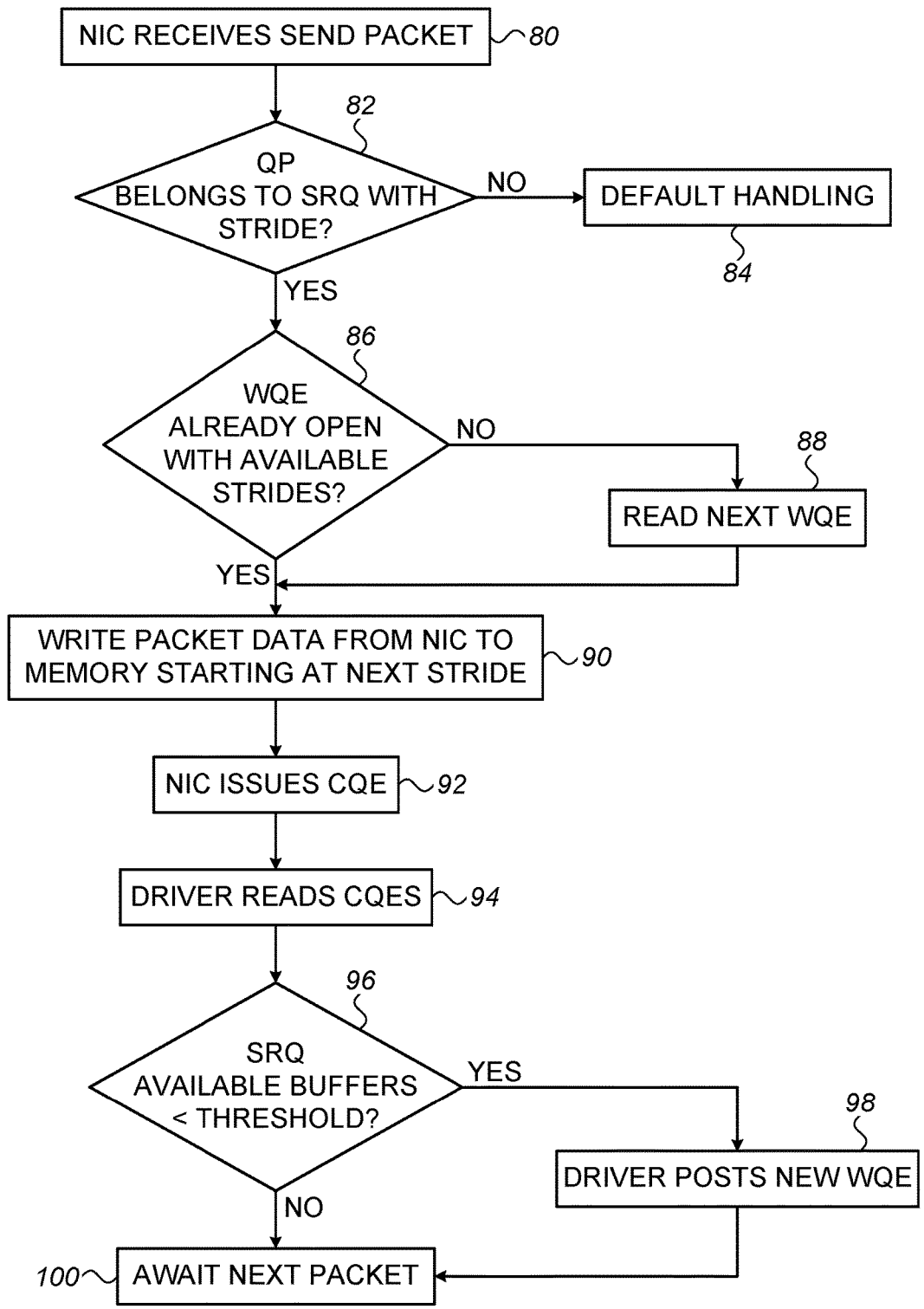
FIG. 3 is a flow chart that schematically illustrates a method for receiving data, in accordance with an embodiment of the present invention.

FIG. 3 is a flow chart that schematically illustrates a method for receiving data by host computer 22, in accordance with an embodiment of the present invention. The method is initiated when NIC 38 receives an incoming send (push data) packet from network 30 via network interface 42, at a packet reception step 80. Packet processing circuitry 44 checks whether the context of the QP of the packet points to a shared receive queue with stride-based WQEs, at a QP checking step 82. If not, NIC 38 can handle the packet using a conventional WQE, buffer, and processing steps, at a default handling step 84 (which is outside the scope of the present description).

If the QP of the packet belongs to a stride-based SRQ, packet processing circuitry 44 checks whether a WQE from this SRQ 62 is already open and has strides 68 available for writing packet data, at a WQE checking step 86. If not, circuitry reads a new WQE 64 from SRQ 62, at a WQE reading step 88. (If no WQEs are available in the queue, NIC 38 will return a negative acknowledgment over network 30 to the sender of the packet, which will subsequently re-send the packet.) In either case, circuitry 44 then writes the data from the packet to the buffer 66 in memory 34 that is indicated by the current WQE, starting at the next available stride 68 (meaning the first stride in the case of a new WQE read at step 88).

When packet processing circuitry 44 has finished writing the data in the current packet to memory 34, it writes a CQE 74 to completion queue 72, at a completion step 92. (Alternatively, in other embodiments, a CQE may be issued for each message or scatter entry in a WQE, for example, as explained above.) Driver program 50 reads CQEs 74, at a CQE reading step 94, and thus tracks the use of buffers 66 and consumption of the corresponding WQEs 64. Driver program 50 may also inform clients 46 when send operations directed to their respective QPs 60 are completed (including multi-packet send operations), whereby clients 46 read and process the data from buffers 66 and then release the buffers for reuse. Alternatively, clients 46 may be programmed to read and handle CQEs 74 directly without intervention of the driver program.

Driver program 50 periodically checks whether the number of remaining WQEs 64 in SRQ 62 (or equivalently, the number of available buffers) has dropped below a predefined threshold limit, at a queue checking step 96. This limit is typically set in software based on a tradeoff between the desired memory footprint and the expected rate of packet arrival on the participating QPs 60. When the number of remaining WQEs has dropped below the limit, driver program 50 reserves one or more additional buffers 66 and writes corresponding WQEs 64 to SRQ 62, at a WQE posting step 98. At this stage, host computer 22 is ready to receive further send packets, at a packet arrival step 100.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method for communication, comprising:
posting in a queue a sequence of work items, each work item pointing to at least one buffer consisting of a plurality of strides of a common, fixed size in a memory;
receiving data packets from a network in a network interface controller (NIC) of the host computer, including at least first and second packets, which respectively contain at least first and second data to be pushed to the memory;
reading from the queue a first work item pointing to a first buffer in the memory;
writing the first data from the NIC to a first number of the strides in the first buffer sufficient to contain the first data without consuming all of the strides in the first buffer;

writing at least a first part of the second data from the NIC to a remaining number of the strides in the first buffer; and when all of the strides in the first buffer have been consumed, reading from the queue a second work item pointing to a second buffer in the memory, and writing further data in the data packets from the NIC to a further number of the strides in the second buffer.

2. The method according to claim 1, wherein writing the further data comprises writing a second part of the second data to the second buffer.

3. The method according to claim 1, wherein the NIC consumes an integer number of the strides in writing the data from each of the packets to the memory.

4. The method according to claim 1, wherein the packets contain respective sequence numbers, and wherein the NIC selects the strides to which the data from each of the packets are to be written responsively to the respective sequence numbers.

5. The method according to claim 1, wherein posting the sequence of the work items comprises setting the size of the strides to correspond to a size of the packets received on a given transport service instance.

6. The method according to claim 5, wherein the packets comprise headers and payloads, and wherein each stride comprises a first part that is mapped to a first region of the memory to receive the header of a given packet and a second part that is mapped to a different, second region of the memory to receive the payload of the given packet.

7. The method according to claim 1, wherein the first and second packets belong to different, first and second messages transmitted to the host computer over the network by one or more peer devices.

8. The method according to claim 7, wherein the first and second messages are transmitted on different, first and second transport service instances, which share the queue of the work items.

9. The method according to claim 7, wherein each of the first and second messages ends with a respective last packet, and wherein the method comprises writing respective completion reports from the NIC to the memory only after writing the data from the respective last packet in each of the first and second messages to the memory.

10. The method according to claim 9, wherein the completion reports contains pointers to the strides to which the data in each of the messages were written.

11. The method according to claim 7, and comprising reserving a contiguous allocation of the strides in the first buffer for the first message, wherein writing the first data comprises writing to the first number of the strides within the contiguous allocation, and wherein writing at least the first part of the second data comprises writing to the remaining number of the strides following the contiguous allocation.

12. The method according to claim 11, and comprising writing a completion report from the NIC to the memory upon consuming the contiguous allocation or upon expiration of a predefined timeout after reserving the contiguous allocation when the contiguous allocation has not been fully consumed by the expiration of the predefined timeout.

13. The method according to claim 7, and comprising reserving a contiguous allocation of the strides in the first buffer for the first message, wherein writing the first data comprises writing to the first number of the strides within the contiguous allocation, and writing a filler completion report from the NIC to the memory even when the contiguous allocation has not been fully consumed in order to release the first buffer and cause a subsequent message to be written to the second buffer.

14. The method according to claim 1, and comprising automatically learning in the NIC, responsively to traffic received from the network, a characteristic size of the messages transmitted to the host computer, and reserving a contiguous allocation of the strides in the first buffer for the first message while deciding how many of the strides to include in the contiguous allocation responsively to the characteristic size of the messages.

15. The method according to claim 14, wherein automatically learning the characteristic size comprises estimating a number of consecutive packets to be included in a large receive offload (LRO) operation.

16. The method according to claim 15, wherein the LRO operation applies to the packets that are received by the NIC in a first flow, which shares a receive queue with at least a second flow, different from the first flow, and wherein the method comprises:

upon receiving a packet from the second flow before the packets in the first flow have consumed all of the strides in the contiguous allocation, issuing a completion report with respect to the strides that have been consumed by the packets in the first flow; and writing the packet in the second flow to one or more of the strides remaining in the contiguous allocation.

17. The method according to claim 1, and comprising writing respective completion reports from the NIC to the memory after writing the data from each of the data packets to the memory.

18. The method according to claim 17, wherein the completion reports contain metadata with respect to transport state information pertaining to the data packets.

19. The method according to claim 18, wherein the metadata are indicative of a state of a large receive offload (LRO) operation performed by the NIC.

20. The method according to claim 1, and comprising writing a respective completion report from the NIC to the memory after writing the data to a final stride belonging to each work item.

21. The method according to claim 20, wherein the completion report contains details of the data packets written to the at least one buffer pointed to by the work item.

22. The method according to claim 1, and comprising writing a respective completion report from the NIC to the memory after writing the data to a given stride when a number of the strides remaining in the first buffer is less than a predefined minimum.

23. The method according to claim 1, and comprising writing completion reports from the NIC to the memory in response to having written the data to the memory, wherein posting the series of work items comprises monitoring consumption of the work items responsively to the completion reports written to the memory, and posting one or more further work items to the queue when a remaining length of the queue drops below a designated limit.

24. A computing apparatus, comprising:
a memory;
a host processor, which is configured to post in a queue a sequence of work items, each work item pointing to at least one buffer in the memory, each buffer consisting of a plurality of strides of a common, fixed size; and
a network interface controller (NIC), which is configured to receive data packets from a network, including at least first and second packets, which respectively contain at least first and second data to be pushed to the memory, to read from the queue a first work item pointing to a first buffer in the memory, to write the first data to a first number of the strides in the first buffer sufficient to contain the first data without consuming all of the strides in the first buffer, to write at least a first part of the second data from the NIC to a remaining number of the strides in the first buffer, and when all of the strides in the first buffer have been consumed, to read from the queue a second work item pointing to a second buffer in the memory, and to write further data in the data packets from the NIC to a further number of the strides in the second buffer.

25. The apparatus according to claim 24, wherein the further data written by the NIC comprises a second part of the second data.

26. The apparatus according to claim 24, wherein the NIC consumes an integer number of the strides in writing the data from each of the packets to the memory.

27. The apparatus according to claim 24, wherein the packets contain respective sequence numbers, and wherein the NIC selects the strides to which the data from each of the packets are to be written responsively to the respective sequence numbers.

28. The apparatus according to claim 24, wherein the NIC is configured to set the size of the strides to correspond to a size of the packets received on a given transport service instance.

29. The apparatus according to claim 24, wherein the first and second packets belong to different, first and second messages transmitted to the computing apparatus over the network by one or more peer devices.

30. The method according to claim 24, wherein the NIC is configured to automatically learn, responsively to traffic received from the network, a characteristic size of the messages transmitted to the host computer, and to reserve a contiguous allocation of the strides in the first buffer for the first message while deciding how many of the strides to include in the contiguous allocation responsively to the characteristic size of the messages.

31. The apparatus according to claim 24, wherein the NIC is configured to write respective completion reports to the memory after writing the data from each of the data packets to the memory.

32. The apparatus according to claim 24, wherein the NIC is configured to write a respective completion report to the memory after writing the data to a final stride belonging to each work item.

33. The apparatus according to claim 24, wherein the NIC is configured to write a respective completion report to the memory after writing the data to a given stride when a number of the strides remaining in the first buffer is less than a predefined minimum.

34. The apparatus according to claim 24, wherein the NIC is configured to write completion reports to the memory in response to having written the data to the memory, and wherein the host processor is configured to monitor consumption of the work items responsively to the completion reports written to the memory, and to post one or more further work items to the queue when a remaining length of the queue drops below a designated limit.

35. A network interface controller (NIC), comprising:
a host interface, which is configured to be connected, via a host bus, to a host processor, which is configured to post a sequence of work items in a queue for access by the NIC, each work item pointing to at least one buffer in a memory, each buffer consisting of a plurality of strides of a common, fixed size;
a network interface, which is configured to receive data packets from a network, including at least first and second packets, which respectively contain at least first and second data to be pushed to the memory; and
packet processing circuitry, which is configured to read from the queue a first work item pointing to a first buffer in the memory, to write the first data via the host interface to a first number of the strides in the first buffer sufficient to contain the first data without consuming all of the strides in the first buffer, to write at least a first part of the second data via the host interface to a remaining number of the strides in the first buffer, and when all of the strides in the first buffer have been consumed, to read from the queue a second work item pointing to a second buffer in the memory, and to write further data in the data packets via the host interface to a further number of the strides in the second buffer.

* * * * *